(12) United States Patent
Chiang et al.

(10) Patent No.: US 6,493,215 B1
(45) Date of Patent: Dec. 10, 2002

(54) KEYBOARD DEVICE FIXED ON A PORTABLE COMPUTER

(75) Inventors: Chih-Hsiang Chiang, Chung-Li (TW); Shin-Chan Lin, Hsin-Chuang (TW); Yu-Feng Wei, Tao-Yuan (TW)

(73) Assignee: Benq Corporation, Taoyuan (TW)

( * ) Notice: Subject to any disclaimer, the term of this patent is extended or adjusted under 35 U.S.C. 154(b) by 218 days.

(21) Appl. No.: 09/704,716

(22) Filed: Nov. 3, 2000

(30) Foreign Application Priority Data

Nov. 11, 1999 (TW) .................................. 88119724 A

(51) Int. Cl.[7] .............................................. G06F 1/16
(52) U.S. Cl. ..................... 361/680; 400/682; 364/708.1
(58) Field of Search ................................ 361/680–683; 341/22; 345/168–172; 235/145; 248/917; 200/514; 400/682; 364/708.1

(56) References Cited

U.S. PATENT DOCUMENTS

| | | | | |
|---|---|---|---|---|
| 5,510,953 A | * | 4/1996 | Merkel | 361/680 |
| 5,966,284 A | * | 10/1999 | Youn et al. | 361/680 |
| 6,320,743 B1 | * | 11/2001 | Jin et al. | 361/680 |

FOREIGN PATENT DOCUMENTS

| | | |
|---|---|---|
| TW | 256382 | 9/1995 |
| TW | 352167 | 2/1999 |

* cited by examiner

Primary Examiner—Lynn D. Feild
Assistant Examiner—Hung Van Duong
(74) Attorney, Agent, or Firm—Winston Hsu

(57) ABSTRACT

A portable computer has a sunken socket on an upper plane of the portable computer for accommodating a keyboard device. A front end and a rear end fixing mechanisms are installed at a front and rear end of the sunken socket respectively for fixing the keyboard device. The rear end fixing mechanism has an aperture. The keyboard device has a base plate, a front edge clamping mechanism installed at the front edge of the base plate for clamping with the front end fixing mechanism of the sunken socket to fix the front edge of the base plate, and a rear edge clamping mechanism installed at the rear edge of the base plate. The rear edge clamping mechanism has at least one fastening device. The fastening device has a track installed at the rear edge of the base plate, a sliding cap slidingly installed on the track along a front-and-rear direction, and a locking device for locking the sliding cap on the track to prevent the sliding cap from moving forward. Thus, a rear protrusion at the rear end of the sliding cap can be fixed in the aperture of the rear end fixing mechanism.

19 Claims, 6 Drawing Sheets

KEYBOARD DEVICE FIXED ON A PORTABLE COMPUTER

BACKGROUND OF THE INVENTION

1. Field of the Invention

The invention relates to a keyboard device, and more particularly, to a keyboard device that can be fixed on a portable computer.

2. Description of the Prior Art

It is a research goal of portable computers to make them more durable and easier to use. In a prior art method, screws are used to install a keyboard device to a portable computer. These screws are drilled into a lower side of the portable computer for fixing the keyboard device. The method is secure, but it is inconvenient for installation, or for removal during maintenance.

Another prior art keyboard device 10 (Taiwan Patent Number 356257) is designed to solve this problem. Please refer to FIG. 1. FIG. 1 is a schematic diagram of a prior art keyboard device 10. The keyboard device 10 comprises a base plate 12, a plurality of key caps 13, and two fastening devices 14. Each fastening device 14 comprises a housing 16, an upper cover 18, a sliding portion 20, and a spring (not shown) installed inside the housing 16. The sliding portion 20 is retractably installed in the housing 16. When installing the keyboard device 10 in a portable computer, the upper cover 18 is pulled backward and thereby causes the sliding portion 20 to retract into the housing 16. After placing the keyboard device 10 in a sunken socket (not shown) on the upper side of the housing of a portable computer, the upper cover 18 is released and the sliding portion 20 extends from the housing 16 because of the spring. Thus, an end of the sliding portion 20 is inserted into an aperture of the sunken socket, and the keyboard device 10 is fixed into the sunken socket. When removing the keyboard device 10, the upper cover 18 is pulled backwards again and thereby causes the sliding portion 20 to retract into the housing 16, and the keyboard device 10 can be removed from the housing of the portable computer.

The prior art keyboard device 10 uses a spring to push the sliding portion 20 and fix the keyboard device 10. However, since the portable computer is often carried and moved, the keyboard device 10 can unexpectedly release from the portable computer due to vibration or impact. That is very inconvenient for the user.

SUMMARY OF THE INVENTION

It is therefore a primary objective of the present invention to provide a keyboard device to solve the above the mentioned problems.

Briefly, in a preferred embodiment, the present invention provides a portable computer comprises a sunken socket on an upper plane of the portable computer for accommodating a keyboard device. A front end and a rear end fixing mechanisms are installed at a front and rear end of the sunken socket respectively for fixing the keyboard device. The rear end fixing mechanism comprises an aperture. The keyboard device comprises a base plate, a front edge clamping mechanism installed at the front edge of the base plate for clamping with the front end fixing mechanism of the sunken socket to fix the front edge of the base plate, and a rear edge clamping mechanism installed at the rear edge of the base plate. The rear edge clamping mechanism comprises at least one fastening device. The fastening device comprises a track installed at the rear edge of the base plate, a sliding cap slidingly installed on the track along a front-and-rear direction, and a locking device for locking the sliding cap on the track to prevent the sliding cap from moving forward. Thus, a rear protrusion at the rear end of the sliding cap can be fixed in the aperture of the rear end fixing mechanism.

It is an advantage of the present invention that the keyboard device can be easily installed onto a portable computer and, furthermore, securely fixed on the portable computer. Thus, the portable computer is more convenient and more reliable.

These and other objectives and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
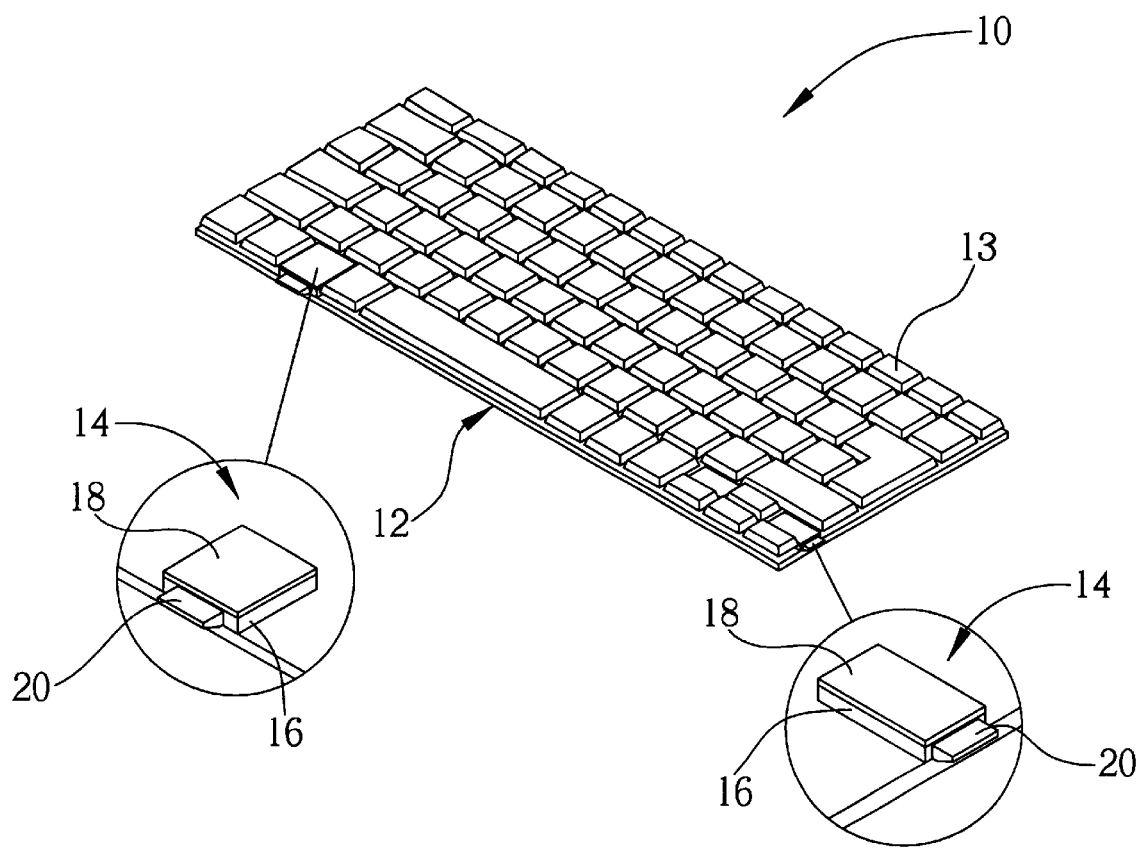
FIG. 1 is a schematic diagram of a prior art keyboard device.
Figure 2:
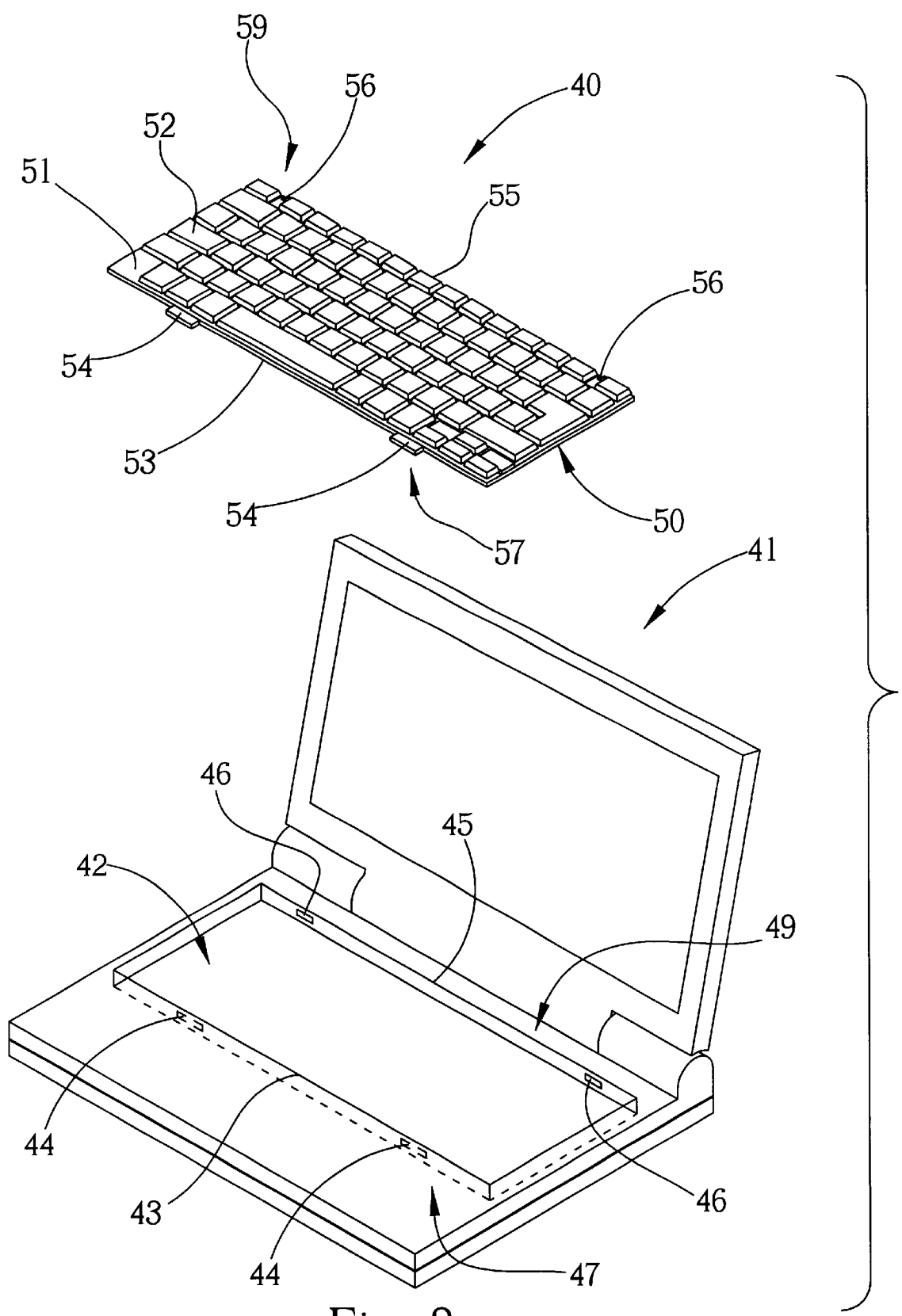
FIG. 2 is a perspective view of the present invention keyboard device and a portable computer.

Please refer to FIG. 2. FIG. 2 is a perspective view of the present invention keyboard device 40 and a portable computer 41. The keyboard device 40 can be fixed into the portable computer 41. The portable computer 41 comprises a sunken socket 42 on an upper plane of the portable computer 41 for accommodating the keyboard device 40. A front end fixing mechanism 47 and a rear end fixing mechanism 49 are installed at a front and rear end 43, 45 of the sunken socket 42 respectively for fixing the keyboard device 40. The front end fixing mechanism 47 comprises two apertures 44, and the rear end fixing mechanism 49 comprises two first couplings (apertures 46). The apertures 44, 46 are separately installed on left and right sides of the front and rear end 43, 45 of the sunken socket 42. The keyboard device 40 comprises a base plate 50 having front and rear edges 53, 55 and a top side 51. The keyboard device 40 also comprises a plurality of key caps 52 depressibly installed on the top side 51 of the base plate 50, a front edge clamping mechanism 57 installed on the front edge 53 of the base plate 50, and a rear edge clamping mechanism 59 installed on the rear edge 55 of the base plate.

The front edge clamping mechanism 57 is used to clamp with the front end fixing mechanism 47 at the front end 43 of the sunken socket 42 to fix the front edge 53 of the base plate 50 to the front end 43 of the sunken socket 42. The front edge clamping mechanism 57 comprises two front protrusions 54 installed on left and right sides of the front edge 53 of the base plate 50 for insertion into the two apertures 44 at the front end 43 of the sunken socket 42 to fix the front edge 53 of the base plate 50 to the front end 43 of the sunken socket 42. The rear edge clamping mechanism 59 comprises two fastening devices 56 installed on left and right sides of the rear edge 55 of the base plate 50. When the front edge 53 of the base plate 50 is fixed to the two apertures 44 at the front end 43 of the sunken socket 42, the two fastening devices 56 can be fixed to the two apertures 46 at the rear end 45 of the sunken socket 42.

Figure 3:
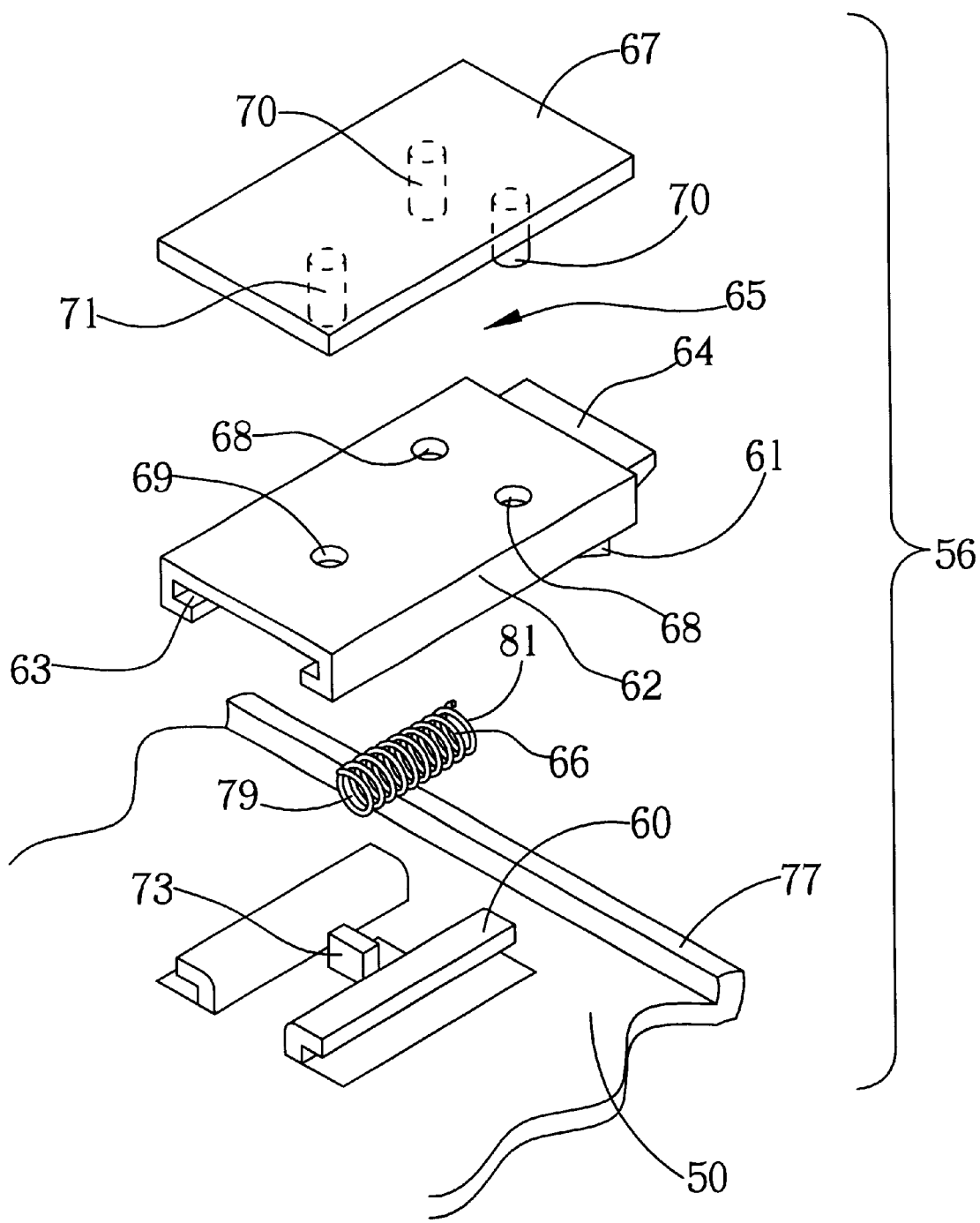
FIG. 3 is an exploded view of the fastening device of the keyboard device shown in FIG. 2.
Figure 4A:
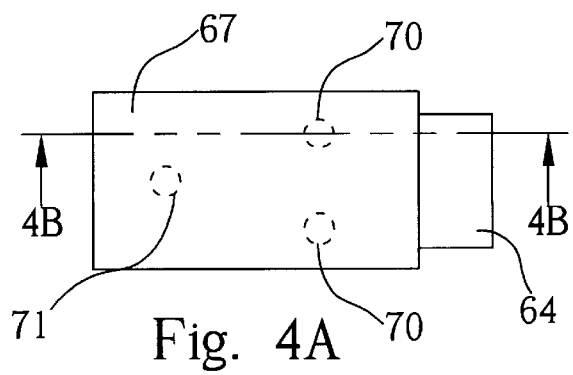
FIG. 4A is a top view of the fastening device shown in FIG. 3.
Figure 4B:
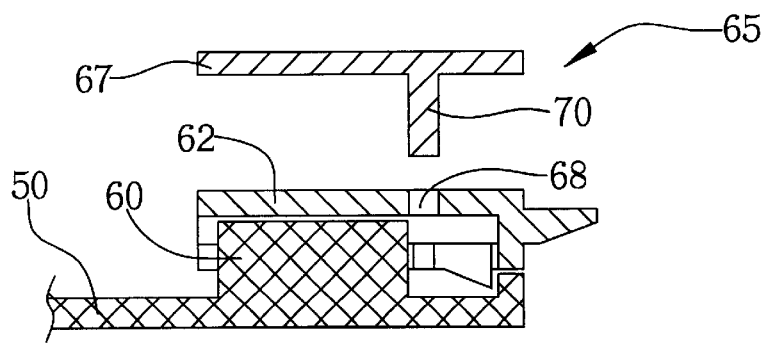
FIG. 4B is a cross-sectional view along line 4B—4B of the fastening device shown in FIG. 4A.

Please refer to FIG. 3, FIG. 4A, and FIG. 4B. FIG. 3 is an exploded view of the fastening device 56 of the keyboard device 40 shown in FIG. 2. FIG. 4A is a top view of the fastening device 56 shown in FIG. 3. FIG. 4B is a cross-sectional view along line 4B—4B of the fastening device 56 shown in FIG. 4A. The fastening device 56 comprises a track 60 installed at the rear edge 55 of the base plate 50 and vertically protruding from the base plate 50, a sliding cap 62 slidingly installed on the track 60 along a front-and-rear direction, a blocking protrusion 73 vertically protruding from the base plate 50, a stopping bar 77 vertically protruding from the base plate 50, an elastic device 66 for pushing the sliding cap 62 backwards towards the rear end of the track 60, and a locking device 65 for locking the sliding cap 62 on the track 60 to prevent the sliding cap 62 from moving forward. The sliding cap 62 comprises a second coupling (rear protrusion 64) at its rear end, a downward protrusion 61 downwardly installed at its rear end, and two engaging slots 63 on its inner side that slidably engage with the track 60. The elastic device 66 comprises a first end 79 and a second end 81; the first end 79 is fixed on the blocking protrusion 73 and the second end 81 is fixed on a rear end of the sliding cap 62 (not shown). The elastic device 66 will push the sliding cap 62 backwards (the up and right direction in FIG. 3) so that the downward protrusion 61 of the sliding cap 62 is pushed to and stopped by the stopping bar 77.

The locking device 65 comprises two insertion holes 68 installed in the sliding cap 62 of the fastening device 56, two pins 70 removably fixed in the two insertion holes 68 of the sliding cap 62, one position hole 69 installed in the sliding cap 62, and one position pin 71 removably fixed in a position hole 69. The two pins 70 and the position pin 71 are installed on a locking cap 67. As shown in FIG. 4B, when the pin 70 is inserted into the insertion hole 68, the lower portion of the pin 70 will be hindered by the track 60 so that the sliding cap 62 can not slide forward (the left direction in FIG. 4B). However, when the pin 70 is removed from the insertion hole 68, the lower portion of the pin 70 will not be hindered by the track 60 so that the sliding cap 62 can slide forward.

When the front edge 53 of the base plate 50 is fixed to the two apertures 44 at the front end 43 of the sunken socket 42, the rear edge 55 of the base plate 50 can be moved to the rear end 45 of the sunken socket 42. After the keyboard device 40 is placed into the sunken socket 42, the elastic device 66 pushes the sliding cap 62 backwards and the rear protrusion 64 of the sliding cap 62 is thus inserted into the aperture 46 at the rear end 45 of the sunken socket 42. Then the locking cap 67 is installed onto the sliding cap 62, and the pins 70 are inserted into the insertion holes 68. The locking device 65 thereby locks the sliding cap 62 to fix the rear protrusion 64 at the rear end of the sliding cap 62 into the aperture 46 the rear end 45 of the sunken socket 42. In this manner, the keyboard device 40 is securely fixed in the sunken socket 42.

Additionally, in the above embodiment, although the first and second couplings are illustrated as the aperture 46 and the rear protrusion 64 respectively, the position of the aperture and the rear protrusion can be exchanged. That is, the first and second couplings can also be designed as a protrusion and an aperture respectively.

Figure 5A:
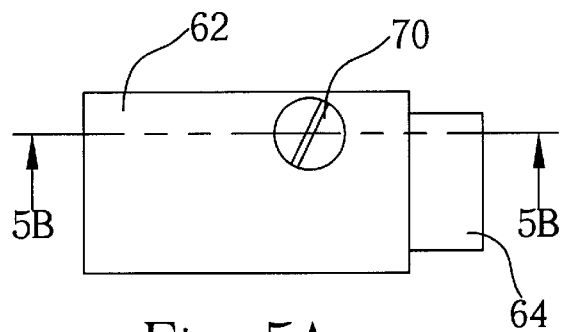
FIG. 5A is a top view of the second embodiment fastening device of the keyboard device shown in FIG. 2.
Figure 5B:
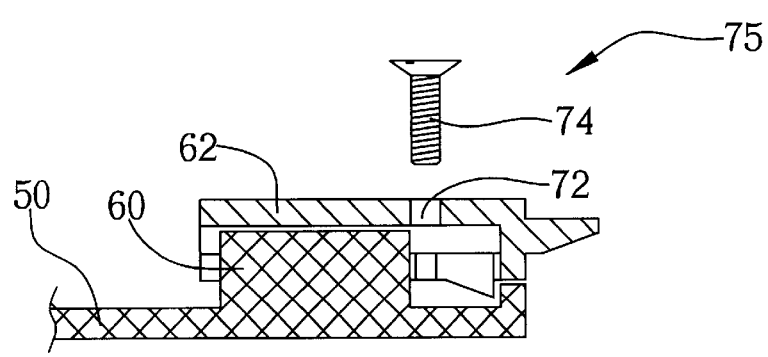
FIG. 5B is a cross-sectional view along line 5B—5B of the fastening device shown in FIG. 5A.

Please refer to FIG. 5A and FIG. 5B. FIG. 5A is a top view of a second embodiment of the fastening device 56 of the keyboard device 40 shown in FIG. 2. FIG. 5B is a cross-sectional view along line 5B—5B of the fastening device shown in FIG. 5A. Compared to the locking device 65 of the previous embodiment that comprised insertion holes 68 and pins 70, the locking device 75 of the second embodiment comprises a screw hole 72 installed in the sliding cap 62 of the fastening device 56, and a screw 74 rotatably fixed in the screw hole 72 of the sliding cap 62. When the screw 74 is rotated so that it moves downward to a predetermined position, the lower portion of the screw 74 will be hindered by the track 60 of the fastening device 56 so that the sliding cap 62 can not slide forward. However, when the screw 74 is rotated so that it moves upward and separates from the screw hole 72, the lower portion of the screw 74 will not be hindered by the track 60 and the sliding cap 62 can slide forward.

Figure 6:
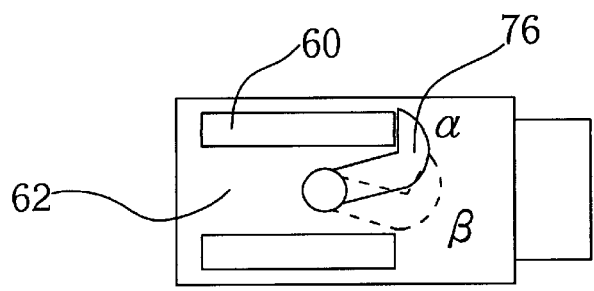
FIG. 6 is a schematic diagram of the third embodiment fastening device of the keyboard device shown in FIG. 2.

Please refer to FIG. 6. FIG. 6 is a schematic diagram of a third embodiment of the fastening device 56 of the keyboard device 40 shown in FIG. 2. The locking device of the third embodiment comprises a hook 76 rotatably installed on the sliding cap 62 of the fastening device 56. When the hook 76 is rotated to a predetermined angle, such as the angle α shown in FIG. 6, the hook 76 will engage with the track 60 so that the sliding cap 62 can not slide forward(the left direction in FIG. 6). However, when the hook 76 is rotated to another predetermined angle, such as the angle β, the hook 76 will not engage with the track 60 and the sliding cap 62 can slide forward.

Figure 7A:
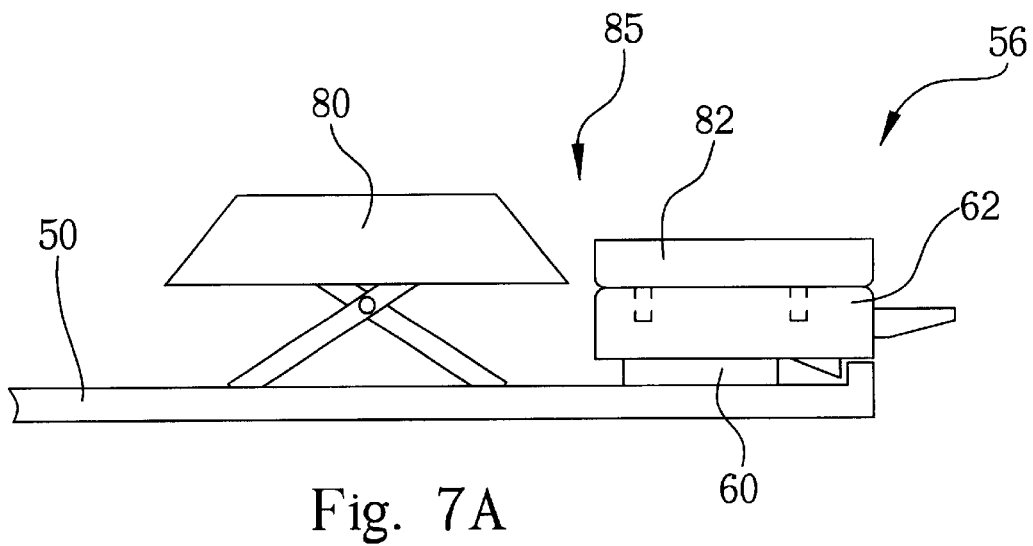
FIG. 7A and FIG. 7B are side views of the forth embodiment keyboard device shown in FIG. 2.
Figure 7B:
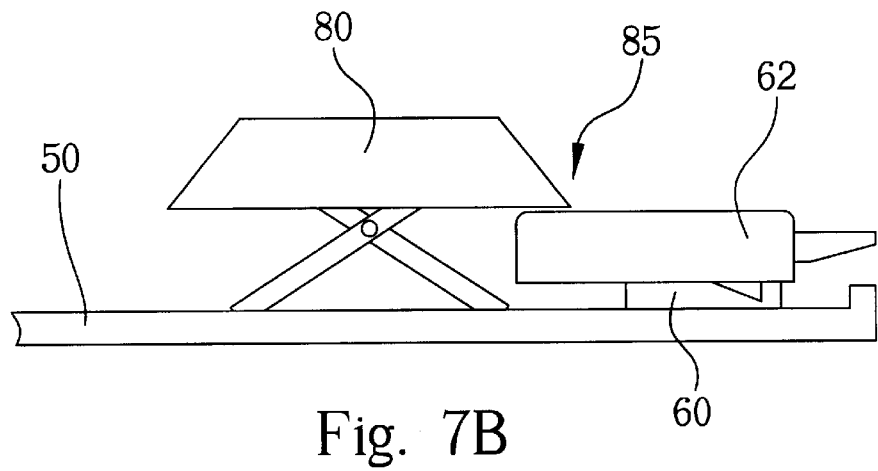

Please refer to FIG. 7A and FIG. 7B. FIG. 7A and FIG. 7B are schematic diagrams of a forth embodiment of the keyboard device 40 shown in FIG. 2. The locking device 85 of the forth embodiment shown in FIG. 7A and FIG. 7B comprises a key cap 80 installed in front of the track 60 of the fastening device 56, and a retainer 82 removably fixed to the sliding cap 62 of the fastening device 56. When the retainer 82 is fixed to the sliding cap 62, the key cap 80 will hinder the retainer 82 so that the sliding cap 62 can not be moved forward (the left direction in FIG. 7A). However, when the retainer 82 is removed, as shown in FIG. 7B, the sliding cap 62 can slide forward into a gap between the key cap 80 and the base plate 50.

Figure 8A:
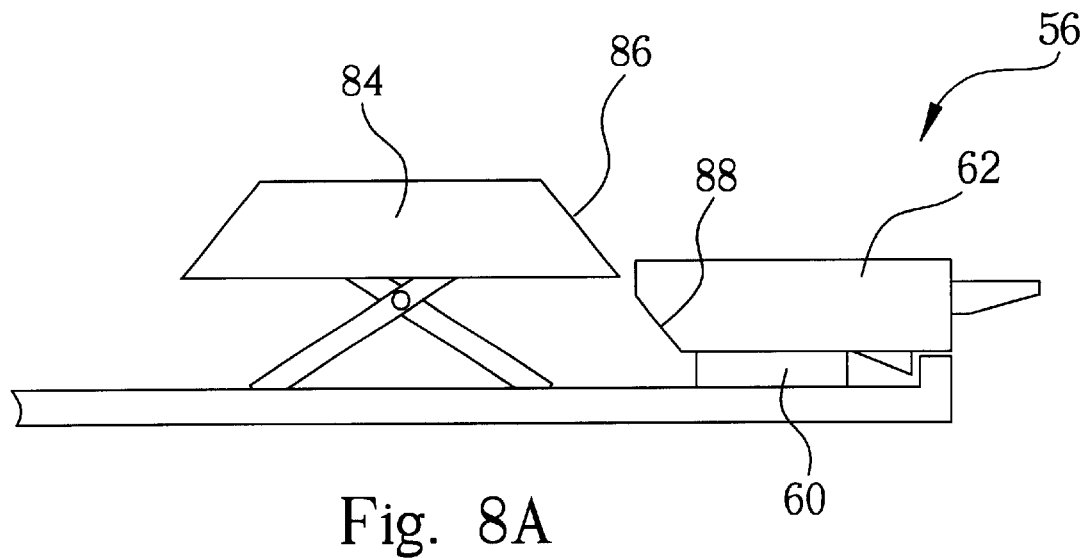
FIG. 8A and FIG. 8B are side views of the fifth embodiment keyboard device shown in FIG. 2.
Figure 8B:
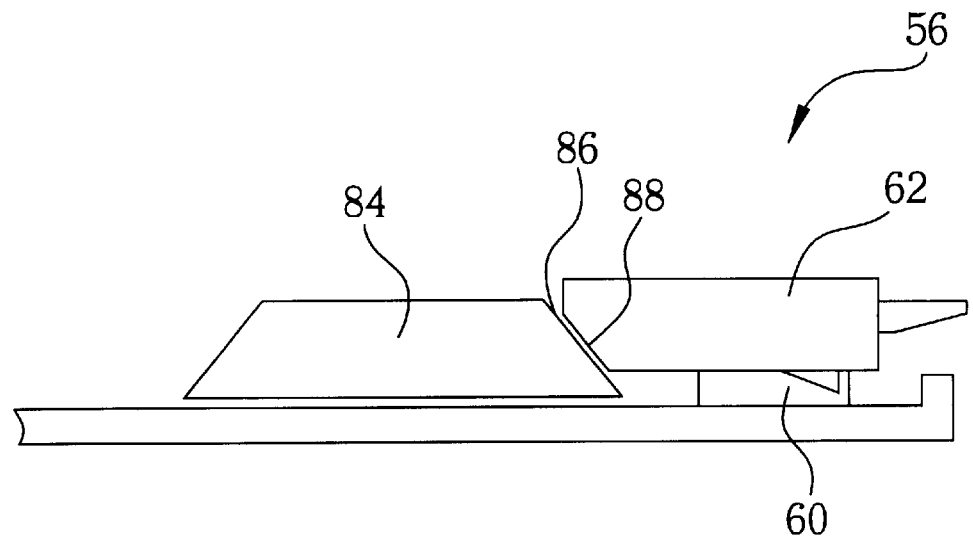

Please refer to FIG. 8A and FIG. 8B. FIG. 8A and FIG. 8B are schematic diagrams of a fifth embodiment of the keyboard device 40 shown in FIG. 2. The locking device of the fifth embodiment shown in FIG. 8A and FIG. 8B is a key cap 84 depressibly installed in front of the track 60 of the fastening device 56. The key cap 84 comprises a key cap bevel 86 installed at the rear end of the key cap 84, and the front end of the sliding cap 62 has a corresponding bevel 88. As shown in FIG. 8A, when the key cap 84 is not depressed, the key cap 84 will hinder the sliding cap 62 of the fastening device 56 so that the sliding cap 56 can not be moved forward (the left direction in FIG. 8A). However, when the key cap 84 is depressed, as shown in FIG. 8B, the key cap bevel 86 will be lowered and the sliding cap 62 can be moved forward until the bevel 88 of the sliding cap 62 contacts the key cap bevel 86.

Besides the variety of the locking devices, there can be a single or multiple numbers the present invention fastening device 56 installed on the rear edge 55 of the base plate 50, and the number of apertures 46 that are separately installed on the rear end 45 of the sunken socket 42 will correspond to the number of fastening devices 56. There can also be either a single or a multiple number of front protrusions 54 installed on the front edge 53 of the base plate 50, with a corresponding number of apertures 44 installed on the front end 43 of the sunken socket 42. Additionally, commonly seen fixing and clamping devices, such as braces and buckles, can be used to fix the front edge 53 of the base plate 50 to the front end 43 of the sunken socket 42.

Compared to the prior art keyboard device 10, the present invention keyboard device 40 comprises the fastening device 56 and thus the keyboard can be easily fixed to and removed from a portable computer. Furthermore, the locking device of the fastening device 56 can lock the sliding cap 62 on the track 60 to prevent the sliding cap 62 from moving forward, thereby ensuring that the keyboard device will not unexpectedly detach from the portable computer due to impact while moving or carrying the portable computer.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A keyboard device fixed on a portable computer, the portable computer comprising a sunken socket on an upper plane of the portable computer for accommodating the keyboard device, a front end and a rear end fixing mechanisms installed at a front and rear end of the sunken socket respectively for fixing the keyboard device, the rear end fixing mechanism comprising a first coupling, the keyboard device comprising:

a base plate having front and rear edges and a top side;
   a plurality of key caps depressibly installed on the top side of the base plate;
   a front edge clamping mechanism installed at the front edge of the base plate for clamping with the front end fixing mechanism at the front end of the sunken socket to fix the front edge of the base plate to the front end of the sunken socket;
   a rear edge clamping mechanism installed at the rear edge of the base plate which comprises at least one fastening device, the fastening device comprising:
      a track installed at the rear edge of the base plate;
      a sliding cap slidingly installed on the track along a front-and-rear direction and comprising a second coupling at its rear end; and
      a locking device for locking the sliding cap on the track to prevent the sliding cap from moving forward;
   wherein when the front edge of the base plate is fixed to the front end fixing mechanism at the front end of the sunken socket, the rear edge of the base plate can be moved to the rear end of the sunken socket, and the sliding cap can be slid backwards and the second coupling at its rear end can couple with the first coupling of the rear end fixing mechanism at the rear end of the sunken socket and then the locking device locks the sliding cap to fix the second coupling at the rear end of the sliding cap to the first coupling of the rear end fixing mechanism at the rear end of the sunken socket.

2. The keyboard device of claim 1 wherein the first coupling is an aperture, and the second coupling is a protrusion, when the sliding cap slides backwards, the second coupling can be inserted into the first coupling.

3. The keyboard device of claim 1 wherein the fastening device further comprises an elastic device for pushing the sliding cap backward to the rear end of the track.

4. The keyboard device of claim 1 wherein the locking device is a key cap depressibly installed in front of the track of the fastening device; wherein when the key cap is not depressed the key cap will hinder the sliding cap of the fastening device so that the sliding cap can not be moved forward; however, when the key cap is depressed the key cap will not hinder the sliding cap of the fastening device and the sliding cap can be moved forward.

5. The keyboard device of claim 1 wherein the locking device comprises a key cap installed in front of the track of the fastening device, and a retainer removably fixed to the sliding cap of the fastening device; wherein when the retainer is fixed to the sliding cap, the key cap will hinder the retainer so that the sliding cap can not be moved forward; however, when the retainer is removed, the sliding cap can slide forward into a gap between the key cap and the base plate.

6. The keyboard device of claim 1 wherein the locking device comprises a screw hole installed in the sliding cap of the fastening device, and a screw rotatably fixed in the screw hole of the sliding cap; wherein when the screw is rotated so that it moves downward to a predetermined position, the lower portion of the screw will be hindered by the track so that the sliding cap can not slide forward; however, when the screw is rotated so that it moves upward to another predetermined position, the lower portion of the screw will not be hindered by the track and the sliding cap can slide forward.

7. The keyboard device of claim 1 wherein the locking device comprises at least one insertion hole installed in the sliding cap of the fastening device, and a pin removably fixed in the insertion hole of the sliding cap; wherein when the pin is inserted into the insertion hole, the lower portion of the pin will be hindered by the track so that the sliding cap can not slide forward; however, when the pin is removed from the insertion hole, the lower portion of the pin will not be hindered by the track so that the sliding cap can slide forward.

8. The keyboard device of claim 1 wherein the locking device comprises a hook rotatably installed on the sliding cap of the fastening device; wherein when the hook is rotated to a predetermined angle, the hook will engage with the track so that the sliding cap can not slide forward; however, when the hook is rotated to another predetermined angle, the hook will not engage with the track so that the sliding cap can slide forward.

9. The keyboard device of claim 2 wherein the rear end fixing mechanism comprises two apertures separately installed on left and right sides of the rear end of the sunken socket, and the rear edge clamping mechanism comprises two fastening devices installed on left and right sides of the rear edge of the base plate, and when the front edge of the base plate is fixed to the front end fixing mechanism at the front end of the sunken socket, the rear protrusions of the two sliding caps are locked into the two apertures of the rear end fixing mechanism at the rear end of the sunken socket by the two locking devices of the two fastening devices.

10. The keyboard device of claim 2 wherein the front end fixing mechanism comprises two apertures separately installed on left and right sides of the front end of the sunken socket, and the front edge clamping mechanism comprises two front protrusions installed on left and right sides of the front edge of the base plate for insertion into the two apertures at the front end of the sunken socket to fix the front edge of the base plate to the front end of the sunken socket.

11. The keyboard device of claim 4 wherein the key cap comprises a key cap bevel installed at the rear end of the key cap, and the front end of the sliding cap has a corresponding bevel; wherein when the key cap is not depressed, the key cap will hinder the sliding cap and the sliding cap can not be moved forward; however, when the key cap is depressed, the key cap bevel will be lowered and the sliding cap can be moved forward until the bevel of the sliding cap contacts the key cap bevel.

12. An keyboard fastening device on a portable computer for fixing a keyboard device into a sunken socket of the portable computer, the keyboard device comprising a base plate and a plurality of key caps, the fastening device installed on the base plate comprising:

at least one track installed on the base plate and protruding from the base plate;

a sliding cap with at least one engaging slot on its inner side slidably engaging with the track and a downward protrusion downwardly installed at its rear end;

a blocking protrusion protruding from the base plate;

a stopping bar protruding from the base plate; and an elastic device installed between the sliding cap and the base plate and comprising a first end and a second end, the first end is fixed on the blocking protrusion and the second end is fixed on a rear end of the sliding cap;

wherein the elastic device will push the sliding cap backwards so that the downward protrusion of the sliding cap is pushed to the stopping bar.

13. The keyboard fastening device of claim 12 wherein the keyboard fastening device further comprises a locking device for locking the sliding cap on the track to prevent the sliding cap from moving forward; wherein when the sliding cap is locked by the locking device, a rear protrusion at the rear end of the sliding cap is fixed in an aperture of the sunken socket.

14. The keyboard fastening device of claim 13 wherein the locking device is a key cap depressibly installed in front of the front side of the track of the fastening device; wherein when the key cap is not depressed the key cap will hinder the sliding cap of the fastening device so that the sliding cap can not be moved forward; however, when the key cap is depressed, the key cap will not hinder the sliding cap of the fastening device and the sliding cap can be moved forward.

15. The keyboard fastening device of claim 13 wherein the locking device comprises a key cap installed in front of the track of the fastening device, and a retainer removably fixed to the sliding cap of the fastening device; wherein when the retainer is fixed to the sliding cap, the key cap will hinder the retainer so that the sliding cap can not be moved forward; however, when the retainer is removed, the key cap can slide into a gap between the key cap and the base plate.

16. The keyboard fastening device of claim 13 wherein the locking device comprises a screw hole installed in the sliding cap of the fastening device, and a screw rotatably fixed in the screw hole of the sliding cap; wherein when the screw is rotated so that it moves downward to a predetermined position, the lower portion of the screw will be hindered by the track so that the sliding cap can not slide forward; however, when the screw is rotated so that it moves upward to another predetermined position, the lower portion of the screw will not be hindered by the track so that the sliding cap can slide forward.

17. The keyboard fastening device of claim 13 wherein the locking device comprises at least one insertion hole installed in the sliding cap of the fastening device, and a pin removably fixed in the insertion hole of the sliding cap; wherein when the pin is inserted in the insertion hole, the lower portion of the pin will be hindered by the track so that the sliding cap can not slide forward; however, when the pin is removed from the insertion hole, the lower portion of the pin will not be hindered by the track so that the sliding cap can slide forward.

18. The keyboard fastening device of claim 13 wherein the locking device comprises a hook rotatably installed in the sliding cap of the fastening device; wherein when the hook is rotated to a predetermined angle, the hook will engage with the track so that the sliding cap can not slide forward; however, when the hook is rotated to another predetermined angle, the hook will not engage with the track so that the sliding cap can slide forward.

19. The keyboard fastening device of claim 14 wherein the key cap comprises a key cap bevel installed at the rear end of the key cap, and the front end of the sliding cap has a corresponding bevel; wherein when the key cap is not depressed, the key cap will hinder the sliding cap and the sliding cap can not be moved forward; however, when the key cap is depressed, the key cap bevel will be lowered and the sliding cap can be moved forward until the bevel of the sliding cap contacts the key cap bevel.

* * * * *